United States Patent
Falkinder et al.

(10) Patent No.: US 11,836,053 B2
(45) Date of Patent: Dec. 5, 2023

(54) RESOURCE ALLOCATION FOR SYNTHETIC BACKUPS

(71) Applicant: HEWLETT PACKARD ENTERPRISE DEVELOPMENT LP, Houston, TX (US)

(72) Inventors: David Malcolm Falkinder, Bristol (GB); Richard Phillip Mayo, Bristol (GB); Peter Thomas Camble, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 15 days.

(21) Appl. No.: 17/448,968

(22) Filed: Sep. 27, 2021

(65) Prior Publication Data

US 2023/0098965 A1 Mar. 30, 2023

(51) Int. Cl.
*G06F 11/14* (2006.01)
*G06F 12/08* (2016.01)
*G06F 11/07* (2006.01)
*G06F 12/0871* (2016.01)

(52) U.S. Cl.
CPC ........ *G06F 11/1469* (2013.01); *G06F 11/076* (2013.01); *G06F 11/0757* (2013.01); *G06F 11/1451* (2013.01); *G06F 12/0871* (2013.01); *G06F 2212/1021* (2013.01)

(58) Field of Classification Search
CPC ............. G06F 11/1469; G06F 11/0757; G06F 11/076; G06F 11/1451; G06F 12/0871; G06F 2212/1021
See application file for complete search history.

(56) References Cited

U.S. PATENT DOCUMENTS

| | | | |
|---|---|---|---|
| 6,823,428 B2 | 11/2004 | Rodriguez et al. | |
| 8,935,446 B1 | 1/2015 | Shilane et al. | |
| 9,177,028 B2 | 11/2015 | Chambliss et al. | |
| 9,189,402 B1 | 11/2015 | Smaldone et al. | |
| 9,372,810 B2 | 6/2016 | Voigt | |
| 9,390,116 B1 | 7/2016 | Li et al. | |
| 10,289,549 B1 | 5/2019 | Shilane et al. | |
| 10,430,102 B2 | 10/2019 | Kaczmarczyk et al. | |

(Continued)

FOREIGN PATENT DOCUMENTS

WO   WO-2008149348   12/2008

OTHER PUBLICATIONS

Mayo et al., U.S. Appl. No. 17/060,456 entitled Metadata Cache for Storing Manifest Portion filed Oct. 1, 2020 (39 pages).

*Primary Examiner* — Masud K Khan
(74) *Attorney, Agent, or Firm* — Trop, Pruner & Hu, P.C.

(57) ABSTRACT

Example implementations relate to metadata operations in a storage system. An example storage system includes a machine-readable storage storing instructions executable by a processor to determine to generate a synthetic full backup based on data stream representations of a plurality of data streams. The instructions are also executable to, in response to a determination to generate the synthetic full backup, create a logical group including the data stream representations. The instructions are also executable to specify a cache resource allocation for the logical group, and generate the synthetic full backup from data stream representations using an amount of a cache resource limited by the cache resource allocation for the logical group.

20 Claims, 13 Drawing Sheets

(56) References Cited

U.S. PATENT DOCUMENTS

2018/0095895 A1\* 4/2018 Pugsley ................ G06F 12/126
2019/0213088 A1\* 7/2019 Olson .................... G06F 12/12
2020/0019514 A1 1/2020 Desai
2020/0241907 A1\* 7/2020 Dornemann ........ G06F 11/2094

\* cited by examiner

| Policy 1 | Fixed Allocation |
| Policy 2 | Bounded Scaling |
| Policy 3 | Non-Linear Scaling |
| Policy 4 | Client Directed |

Policy Table 650

| Entry 810 | Stream 820 | Value 830 |
|---|---|---|
| 8 | C | 1 |
| 1 | A | 1 |
| 2 | A | 2 |
| 3 | B | 1 |
| 4 | B | 2 |
| 5 | B | 2 |
| 6 | B | 2 |
| 7 | B | 2 |
| 9 | C | 10 |
| 10 | D | 1 |

800

870

↓ Eviction Order

FIG. 8C

RESOURCE ALLOCATION FOR SYNTHETIC BACKUPS

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIGS. 8A-8C are illustrations of example data structures, in accordance with some implementations.

Figure 1:
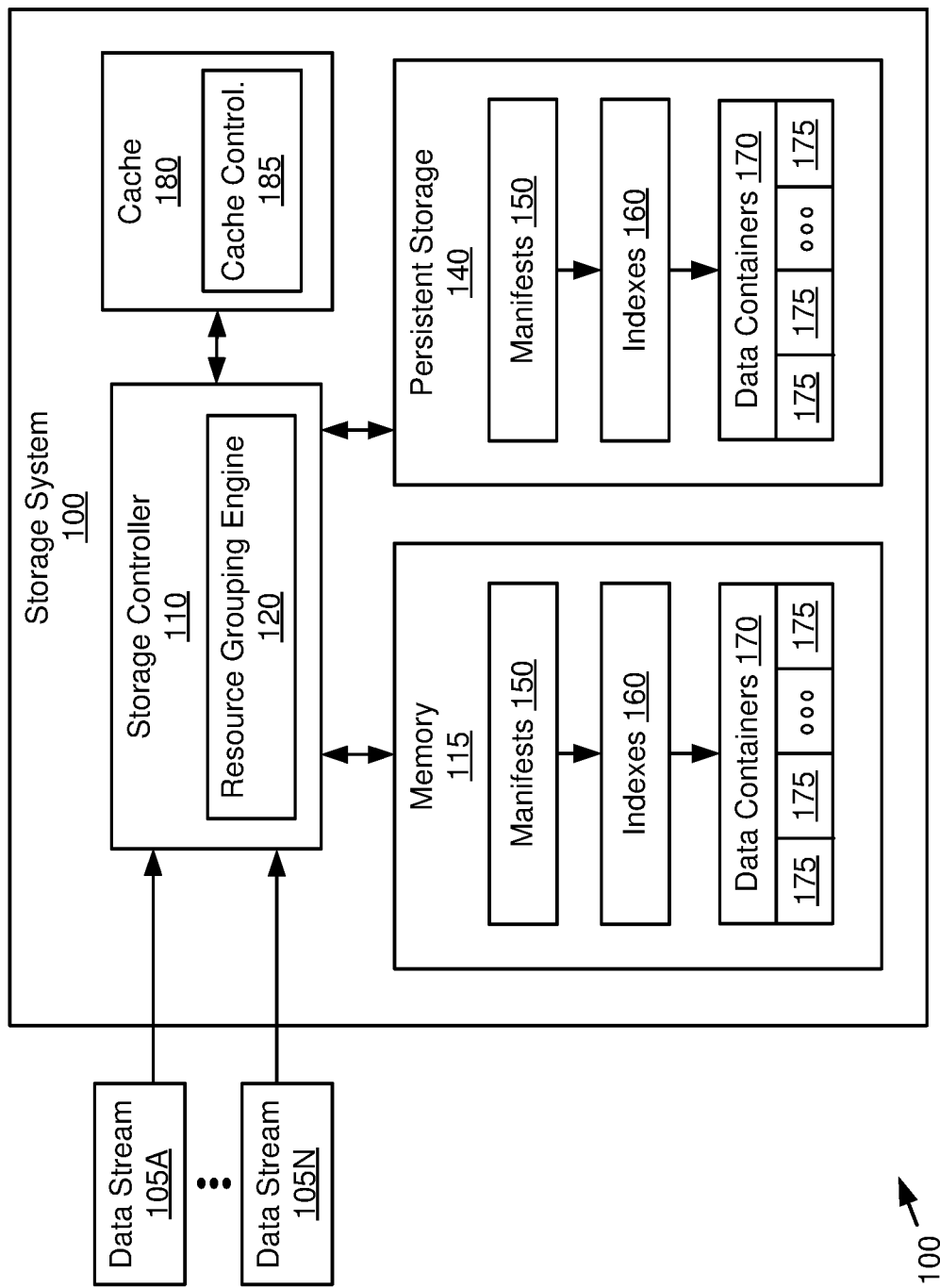
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing one or more inbound data streams (e.g., multiple concurrent inbound data streams). For example, such metadata may include data recipes (also referred to herein as "manifests") that specify the order in which particular data units are received (e.g., in a data stream). Subsequently, in response to a read request, the deduplication system may use a set of manifests to determine the received order of data units, and may thereby recreate the original data stream. Accordingly, the set of manifests may be a representation of the original data stream. The manifests may include a sequence of records, with each record representing a particular set of data unit(s).

In some examples, the deduplication storage system may process an inbound data stream to store a deduplicated copy of all data blocks in a particular collection of data (e.g., a file, a directory, and so forth), which may be referred to herein as a "full backup" of the collection of data. Subsequently, the deduplication storage system may process another data stream to store a deduplicated copy of only those data blocks of the collection of data that have changed since the prior backup, which may be referred to herein as an "incremental backup" of the collection of data. Further, the deduplication storage system may continue processing additional data streams to generate incremental backups at different points in time.

In some examples, the deduplication storage system may recreate the collection of data as it existed at a specific point in time based on the full backup and a sequence of incremental backups. Specifically, the deduplication storage system may recreate the data from the full backup, and may also recreate the data from each following incremental backup until reaching the incremental backup corresponding to the specific point in time. In this manner, the changes that were made to the collection of data may be accumulated in order until reaching the state of the collection of data as it existed at the specific point in time. The full copy of the collection of data that is recreated from a full backup and a set of incremental backups may be referred to herein as a "synthetic full backup." Further, the full backup and incremental backups that are used to generate the synthetic full backup may be referred to herein as the "component backups" of the synthetic full backup. An example generation of a synthetic full backup is described below with reference to FIG. 3.

In some examples, when generating a synthetic full backup (e.g., in response to a read request), the deduplication storage system may have to access and read metadata from multiple data streams corresponding to the component backups (e.g., a full backup and incremental backups). Further, the deduplication storage system may allocate an equal amount of system resources for processing each data stream. For example, the deduplication storage system may allocate an equal portion of cache memory to store metadata from each data stream. However, such allocations are limited by the total amount of cache memory that is included in the deduplication storage system.

In some examples, each incremental backup may include multiple changes to various portions of the collection of data, and may overwrite portions of data that were included in previous component backups. Therefore, generating the synthetic full backup may involve repeatedly jumping back and forth between any number of component backups to read various data portions. However, because the available amount of cache memory is limited, the metadata may have to repeatedly loaded (e.g., to be read) and unloaded (e.g., to make room for other metadata) from the cache memory. This "churning" of data may cause the cache memory to be less likely to store data that is required at a given point. Accordingly, the performance improvement that is normally provided by cache memory (i.e., to provide rapid access to required data) may be reduced or eliminated while generating a synthetic full backup. Further, the repeated loading and unloading of data in the cache memory may consume substantial amounts of bandwidth and time (e.g., to access memory, transfer data, evict data, and so forth) without providing any significant benefit. In addition, these problems may be exacerbated when the deduplication storage system has to support multiple concurrent generations of synthetic full backups (e.g., for different requestors).

In accordance with some implementations of the present disclosure, a storage system may include a storage controller to generate a logical group including multiple data streams that are associated with a synthetic full backup. The logical group may be allocated a particular amount of a limited system resource (e.g., cache memory). Further, the logical group may be assigned a resource policy that specifies how the resource allocation is shared to access metadata for the multiple data streams in the logical group. When generating the synthetic full backup, the storage controller may manage use of the resource allocation in the logical group according to the resource policy. In this manner, the overall utilization of the resource may be intelligently managed to increase efficiency and reduce waste of the resource.

In addition, some implementations may include a cache controller to promote a cache entry that is predicted to be most useful in a current context. Such functionality may include determining which data stream has been most used during a specific time period, identifying the most recent entry of the cache that includes data from the most used data stream, and promoting the identified entry within the cache. In this manner, the data that is most useful for the current context (e.g., generating a synthetic full backup) may remain in the cache for a longer period of time, and may thereby improve the performance of the cache.

FIG. 1—Example Storage System

FIG. 1 shows an example of a storage system 100 that includes a storage controller 110, memory 115, persistent storage 140, and a cache 180, in accordance with some implementations. As shown, the persistent storage 140 may include any number of manifests 150, container indexes 160, and data containers 170. Further, the memory 115 may also include manifests 150, container indexes 160, and data containers 170. The persistent storage 140 may include one or more non-transitory storage media such as hard disk drives (HDDs), solid state drives (SSDs), optical disks, and so forth, or a combination thereof. The memory 115 may be implemented by one or more storage devices, including volatile storage device(s) (e.g., random access memory (RAM)), non-volatile storage device(s) (including persistent storage), or a combination thereof.

In some implementations, the storage system 100 may perform concurrent deduplication of multiple inbound data streams 105A-105N (also referred to herein as "data streams 105"). For example, the storage controller 110 may divide each data stream 105 into data units, and may store at least one copy of each data unit in a data container 170 (e.g., by appending the data units to the end of the container 170). In some examples, each data container 170 may be divided into portions (also referred to herein as "entities") 175. Each entity 175 may include one or more stored data units.

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

In some implementations, the storage controller 110 may generate a manifest 150 to record the order in which the data units were received in each data stream 105. Further, the manifest 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity 175, and that the entity 175 is stored at a particular offset in a data container 170.

In some implementations, the storage controller 110 may receive a read request to access the stored data, and in response may load the manifest 150 into the memory 115 and determine the sequence of data units that made up the original data. The storage controller 110 may then use pointer data included in the manifest 150 to identify the container indexes 160 associated with the data units. Further, the storage controller 110 may load the identified container indexes 160 into the memory 115 and determine the locations that store the data units (e.g., data container 170, entity 175, offsets, etc.). The storage controller 110 may then read the data units from the determined locations.

In some implementations, the storage controller 110 may generate a synthetic full backup (e.g., in response to a read request) based on component backups (e.g., a full backup and incremental backups). This process may include concurrently accessing metadata (e.g., manifests 150 and container indexes 160) from multiple data streams 105 that correspond to the component backups. The accessed metadata may be loaded into the memory 115. In addition, a portion of the accessed metadata may be loaded into the cache 180.

As shown in FIG. 1, the storage controller 110 may include a resource grouping engine 120. In some implementations, the resource grouping engine 120 may detect a trigger event to generate a synthetic full backup, and in response may generate a logical group including representations of the multiple data streams 105 that correspond to the component backups. The resource grouping engine 120 may then assign a resource policy and at least one resource allocation to the logical group. The resource allocation may specify a particular amount of a limited system resource (e.g., cache memory). The resource policy may specify limitations and/or rules regarding how the resource allocation is shared in the logical group. In some implementations, the resource grouping engine 120 may control the use of the resource allocation within the logical group according to the resource policy. In this manner, the resource grouping engine 120 may provide intelligent management of the overall utilization of the system resource, and may thereby increase efficiency and reduce waste of the system resource. The use of logical groups with resource policies and resource allocations is described further below with reference to FIGS. 3-6B. As described herein, an engine may be implemented via hardware (e.g., electronic circuitry) or a combination of hardware and programming, such as at least one processor (hardware) to execute instructions (programming) stored on at least one machine-readable storage medium.

Further, as shown in FIG. 1, the cache 180 may include (or be coupled to) a cache controller 185. In some implementations, the cache controller 185 may detect a failure in the cache 180, and in response may promote a cache entry that is predicted to be most useful in a current context. For example, the cache controller 185 may count the number of cache misses in a specific time period (i.e., the number of instances of a requested data element not being found in the cache 180). The cache controller 185 may detect a cache failure when the number of cache misses exceeds a threshold level. In some implementations, the threshold level may be equal to the number of data elements that can be stored in the cache 180. Further, upon detecting the cache failure, the cache controller 185 may determine which data stream 105 is associated with the most data read from the cache 180 during a specific time period. Further, the cache controller 185 may identify the most recent entry of the cache 180 that is associated with the determined data stream 105, and may promote the identified entry to a position in the cache that is last in eviction order. In this manner, the cache controller 185 may increase the period of time that the most useful entry for the current context (e.g., generating a synthetic full backup) remains in the cache 180, and may thereby improve the performance of the cache 180. The use of the cache controller 185 to promote the cache entry that is predicted to be most useful is described further below with reference to FIGS. 7-8C. In some examples, cache controller 185 may be implemented via hardware (e.g., electronic circuitry) or a combination of hardware and programming (e.g., comprising at least one processor and instructions executable by the at least one processor and stored on at least one machine-readable storage medium). In some examples, cache 180 may be implemented via one or more storage devices, including any volatile or non-volatile storage device(s), or a combination thereof.

Figure 2:
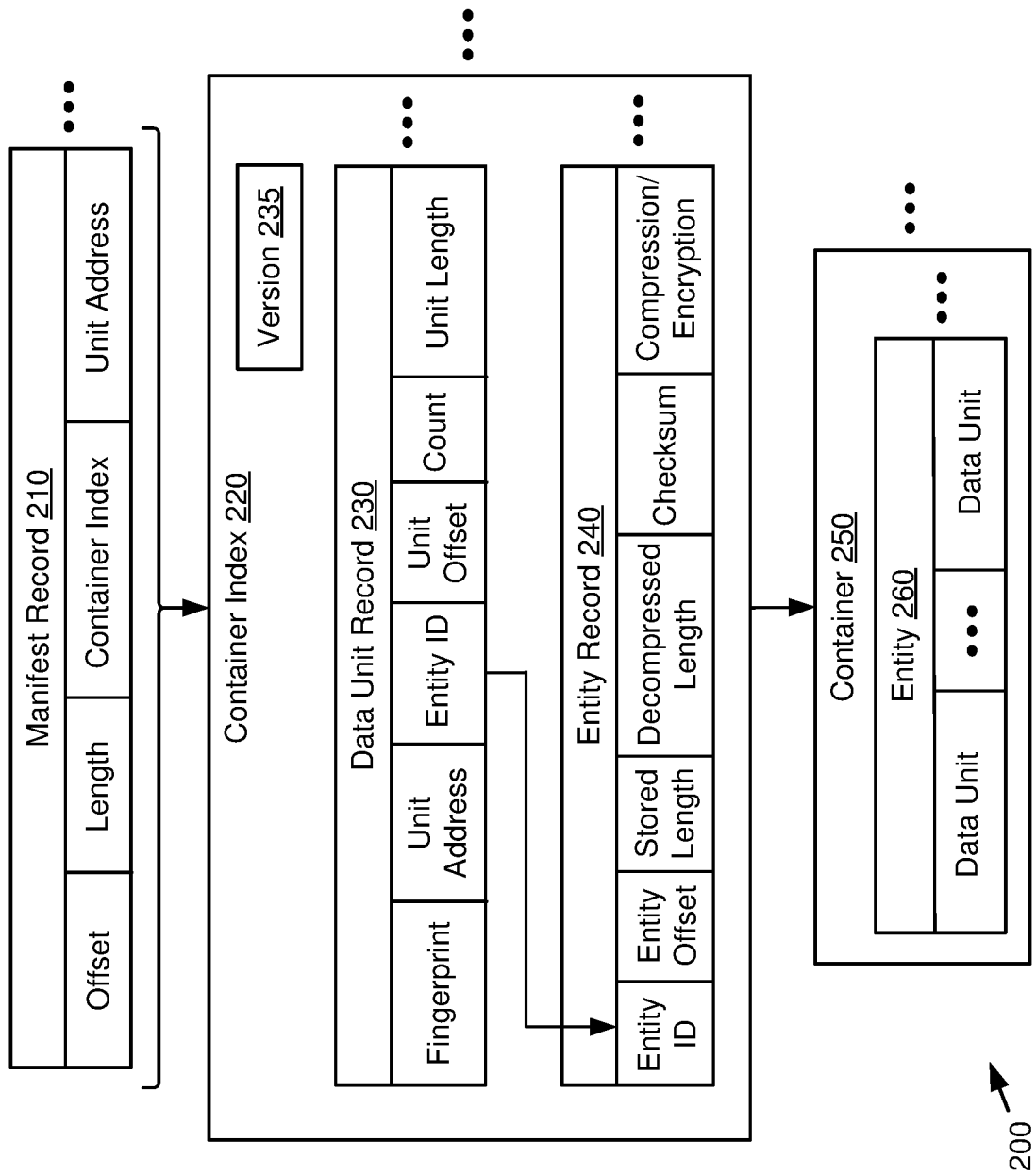
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include a manifest record 210, a container index 220, a container 250, and an entity 260. In some examples, the manifest record 210, the container index 220, the container 250, and the entity 230 may correspond generally to example implementations of a manifest record 155, an index 160, a data container 170, and an entity 175 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a count value, and a unit length. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Figure 3:
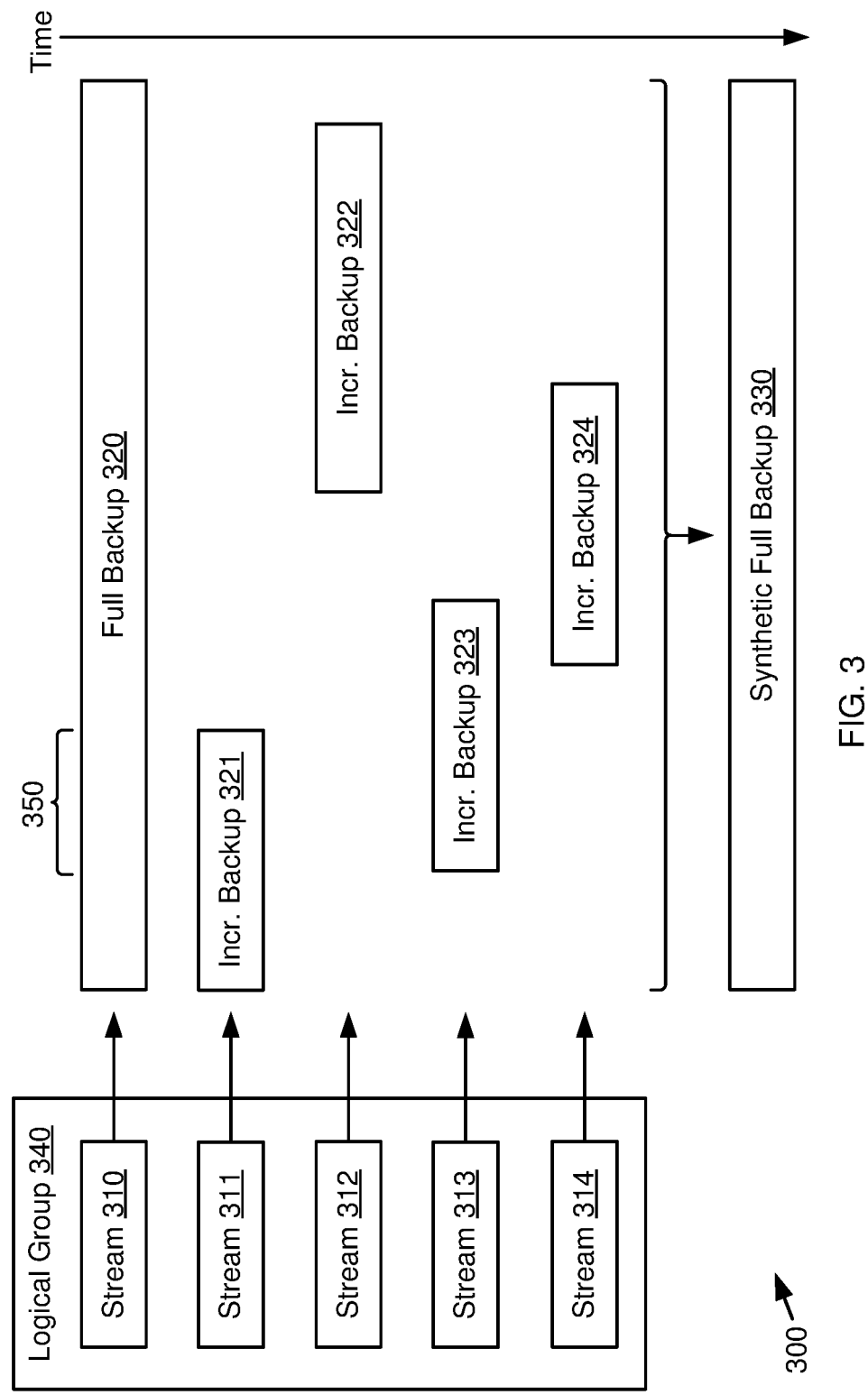
FIG. 3 is an illustration of example data structures, in accordance with some implementations.

FIG. 3—Example Data Structures

Referring now to FIG. 3, shown is an illustration of example data structures 300 involved in generating a synthetic full backup, in accordance with some implementations. As shown, the data structures 300 include multiple data stream representations 310-314 that represent data streams received (e.g., by the system 100 shown in FIG. 1) at different points in time. For example, the data stream representation 310 represents a data stream that is received at a first point in time, and is used to generate the full backup 320 (i.e., including deduplicated copies of all data blocks in a source collection of data). In some implementations, each of the data stream representations 310-340 may include manifest(s) that specify the order in which particular data units were received in an inbound data stream.

Further, the data stream representation 311 represents a data stream that is received at a second point in time, and is used to generate the incremental backup 321 (i.e., including deduplicated copies of only those data blocks of the source collection of data that have changed since the creation of the full backup 320). Furthermore, the data stream representations 312-314 represent data streams that are respectively received at third, fourth, and fifth points in time, and are respectively used to generate the incremental backups 322-324.

As shown in FIG. 3, at a sixth point in time, a synthetic full backup 330 may be generated by recreating and combining the full backup 320 and the incremental backups 321-324. In some implementations, the data changes included in the incremental backups 321-324 may be accumulated in order of creation. For example, note that a portion 350 of the full backup 320 is changed by the incremental backup 321, and is changed again by the incremental backup 323. Accordingly, the synthetic full backup 330 may include all data blocks in the source collection of data as they existed at the fifth point in time (i.e., at the creation time of the last incremental backup 324).

In some implementations, instructions to generate a logical group 340 may be executed in response to a triggering event for generating the synthetic full backup 330. For example, the instructions to generate the logical group 340 may include instructions to define the logical group 340 to include the data stream representations 310-314 that include the data in the component backups (i.e., full backup 320 and incremental backups 321-324) used to generate the synthetic full backup 330. In some implementations, a storage controller (e.g., storage controller 110 shown in FIG. 1) may use the logical group 340 to manage the shared use of a system resource (e.g., cache space) among multiple concurrent processes that access and process the data stream representations 310-314 in order to generate the synthetic full backup 330.

In some implementations, the membership of the logical group 340 may be modified after it has been created. For example, some or all of the data stream representations 310-314 may be removed from the logical group 340 if no longer needed for generating the synthetic full backup 330. Further, other data stream representations may be added to the logical group 340 if needed for generating the synthetic full backup 330.

Figure 4:
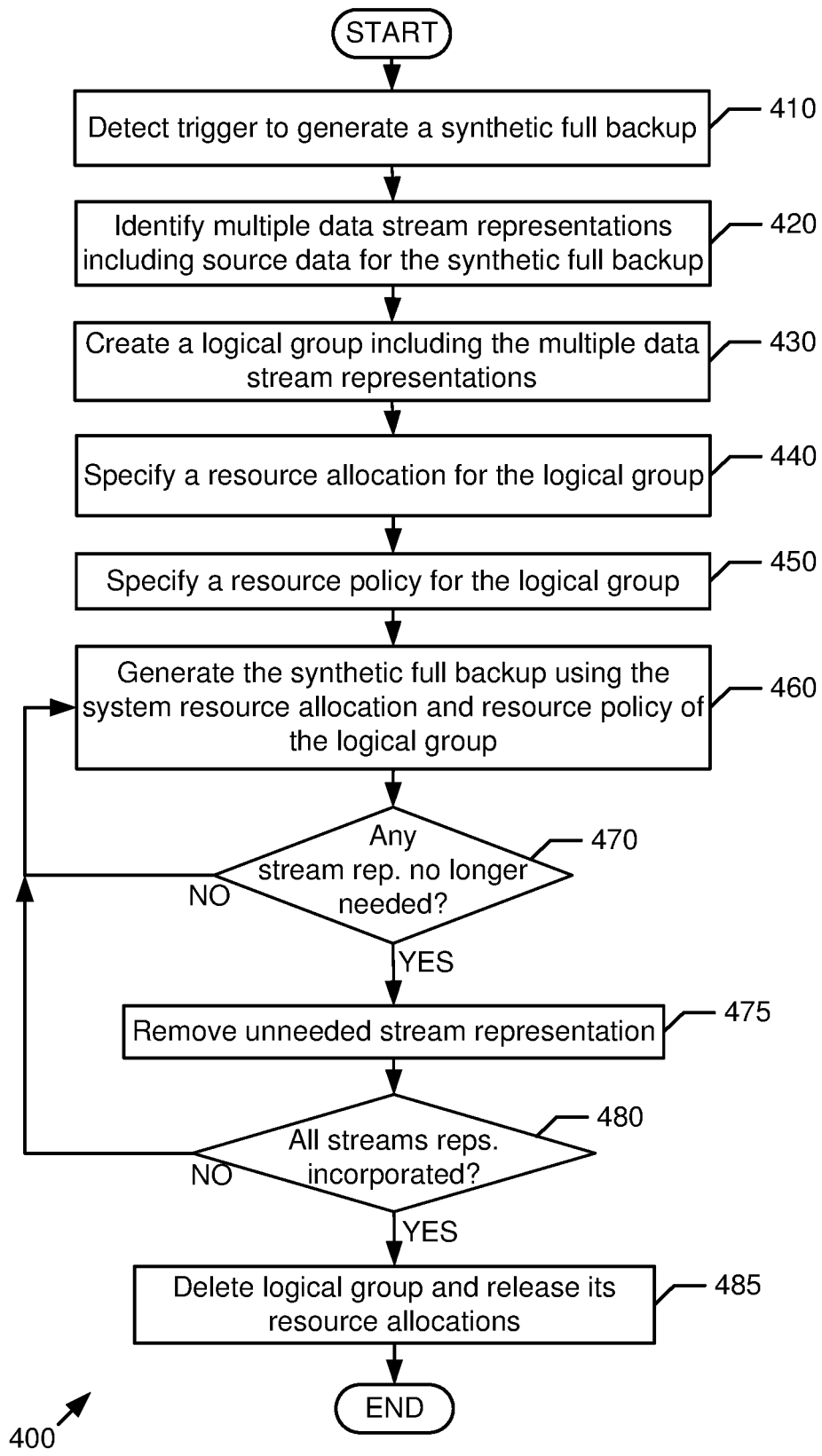
FIG. 4 is an illustration of an example process, in accordance with some implementations.
Figure 5A:
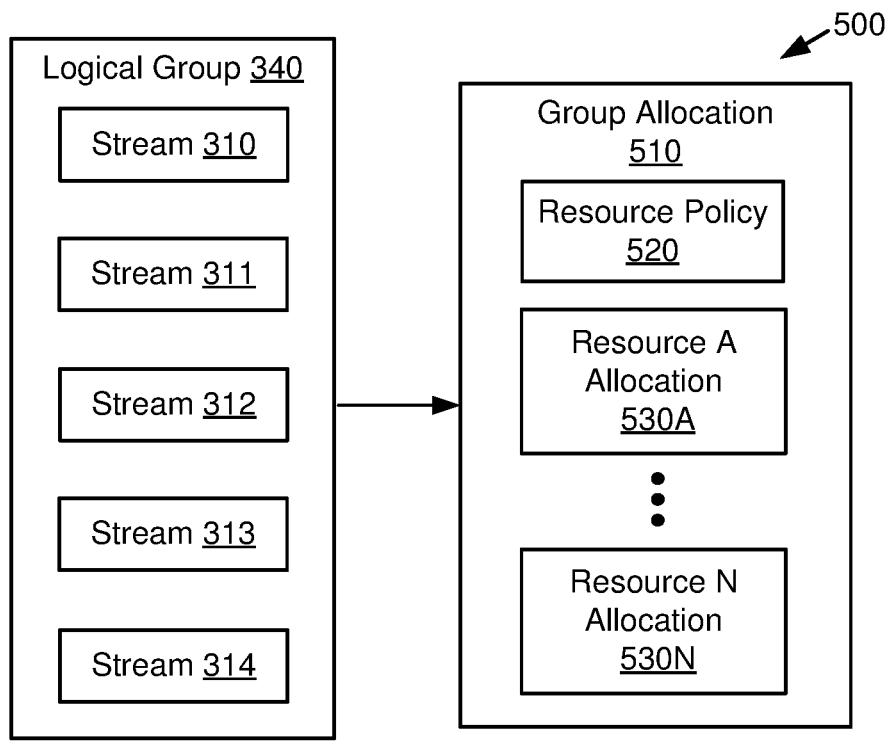
FIGS. 5A-5B are illustrations of example data structures, in accordance with some implementations.
Figure 5B:
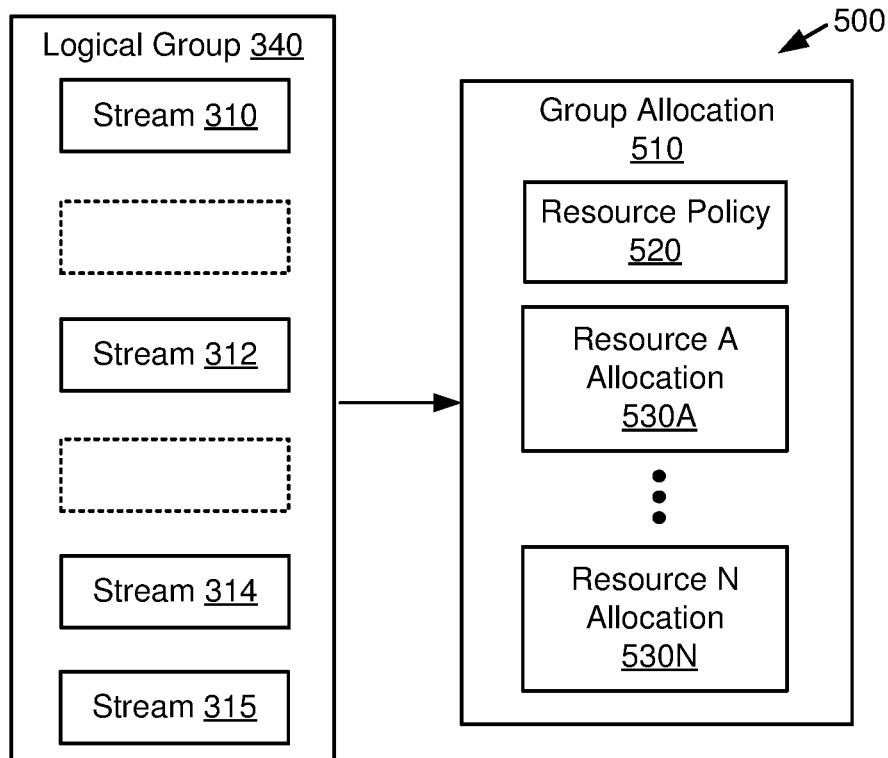

FIGS. 4 and 5A-5B—Example Process for Generating a Synthetic Full Backup Referring now to FIG. 4, shown is an example process 400 for generating a synthetic full backup, in accordance with some implementations. The process 400 may be performed by the storage controller 110 executing instructions (which may include instructions of the resource grouping engine 120), or by the resource grouping engine 120 (which may include circuitry or hardware (e.g., a controller) and associated programming (e.g., instructions)). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 are described below with reference to FIGS. 5A-5B, which show example data structures 500 in accordance with some implementations. However, other implementations are also possible.

Block 410 may include determining to generate a synthetic full backup. Block 420 may include identifying multiple data streams including the source data for the synthetic full backup. Block 430 may include creating a logical group including the multiple data streams. For example, referring to FIGS. 1 and 3, the storage controller 110 may receive a command or request (e.g., from an internal process, from a client, etc.) to generate a synthetic full backup 330 to recreate the state of a source collection of data at a specific point in time. In response to the request, the storage controller 110 may determine that the specific point in time corresponds to the creation time of the incremental backup 324, and may thereby determine that the synthetic full backup 330 may be generated by combining the full backup 320 and the incremental backups 321-324. The storage controller 110 may then generate a logical group 340 that includes the data stream representations 310-314, which correspond respectively to the full backup 320 and the incremental backups 321-324.

Referring again to FIG. 4, block 440 may include specifying a resource allocation for the logical group. Block 450 may include specifying a resource policy for the logical group. Block 460 may include generating the synthetic full backup using the system resource allocation and resource policy of the logical group. For example, referring to FIGS. 1 and 5A, the storage controller 110 may assign a group allocation 510 to the logical group 340 (including data stream representations 310-314). As shown in FIG. 5A, in some embodiments, the group allocation 510 may include a resource policy 520 and any number of resource allocations 530A-530N (also referred to herein as "resource allocations 530"). Each resource allocation 530 may specify a particular portion (e.g., amount, percentage, etc.) of a system resource (e.g., cache memory, bandwidth, storage, etc.) that is allocated exclusively to the logical group 340. The resource policy 520 may specify limitations and/or rules regarding how the resource allocations 530 are shared within the logical group 340. Some examples of resource policies 520 are described below with reference to FIG. 6B. The storage controller 110 may manage the use of the resource allocations 530 according to the resource policy 520, and may thereby generate the requested synthetic full backup.

Referring again to FIG. 4, decision block 470 may include determining whether any data stream representation in the logical group is no longer needed for generating the synthetic full backup. If not, the process 400 may return to block 460 (described above). Otherwise, if it is determined at decision block 470 that a data stream in the logical group is no longer needed, then the process 400 may continue at block 475, including removing the unneeded data stream from the logical group. For example, referring to FIGS. 1 and 5B, the storage controller 110 may determine that all data changes to the full backup 320 represented by the data stream representations 311 and 313 have already been processed (i.e., incorporated into the synthetic full backup 330), and therefore the data streams 311 and 313 are no longer needed for the generation of the synthetic full backup 330. Accordingly, as shown in FIG. 5B, the data streams 311 and 313 may be removed from the logical group 340. Further, in some implementations, the membership of the logical group 340 may be increased after it has been created. For example, as shown in FIG. 5B, the data stream 315 may be added to the logical group 340 if needed to generate the synthetic full backup.

Referring again to FIG. 4, decision block 480 may include determining whether all data stream representations included in the logical group have been incorporated into the synthetic full backup. If not, the process 400 may return to block 460 (described above). Otherwise, if it is determined at decision block 480 that all data stream representations in the logical group have been incorporated into the synthetic full backup, then the process 400 may continue at block 485, including deleting the logical group and releasing its resource allocations. After block 485, the process 400 may be completed. For example, referring to FIGS. 1 and 5B, the storage controller 110 may determine that the remaining data stream representations 310, 312, and 314 in the logical group 340 have already been processed (or were previously removed from the logical group 340). In response, the storage controller 110 may delete the logical group 340, and may release its resource allocations 530A-530N (i.e., make the resource allocations available to be assigned to another logical group).

Figures 6A, 6B:
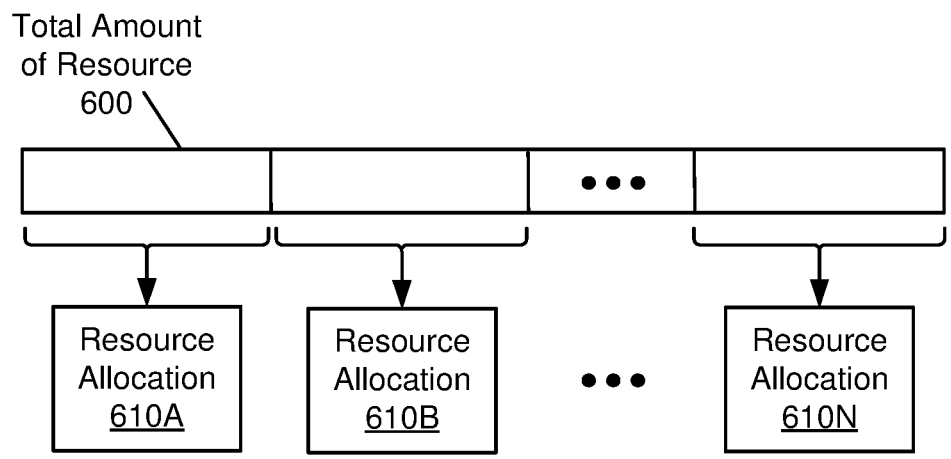
FIGS. 6A-6B are illustrations of example data structures, in accordance with some implementations.

FIGS. 6A-6B—Example Data Structures

Referring now to FIG. 6A, shown is an illustration of multiple resource allocations 610A-610N (also referred to herein as "resource allocations 610"). As shown, each resource allocation 610 may represent a fixed or variable portion of a total amount 600 of a system resource. In some implementations, each resource allocation 610 may be reserved for (or otherwise assigned to) a different logical group.

Referring now to FIG. 6B, shown is an illustration of a policy table 650. In some implementations, the policy table 650 may be a stored data structure that is used to select the resource policy 520 (shown in FIG. 5A-5B) assigned to the logical group 340. As shown, the policy table 650 may include various policies 1-4, with each policy reflecting a different strategy or methodology for managing a resource allocation for a logical group.

For example, the first policy of "fixed allocation" may specify that each resource allocation is fixed at the time of creation of the logical group, and is not modified when the logical group changes (e.g., when a data stream representation is removed from the logical group). In another example, the second policy of "bounded scaling" may specify that the resource allocation is increased uniformly for each data stream representation that is added to the logical group until a maximum level is reached.

In yet another example, the third policy of "non-linear scaling" may specify that the first data stream representation in the logical group is assigned a first configurable amount X, and any additional data stream representations that are added to the logical group are assigned a second configurable amount Y (e.g., where Y may be smaller than X, or Y may be larger than X). In still another example, the fourth policy of "client directed" may specify that a client application or user is able to specify the amounts allocated to each data stream representation (e.g., by allocating larger amounts to data stream representations for full backups than to data stream representations for incremental backups).

FIGS. 7 and 8A-8C—Example Process for Promoting a Cache Entry

Figure 7:
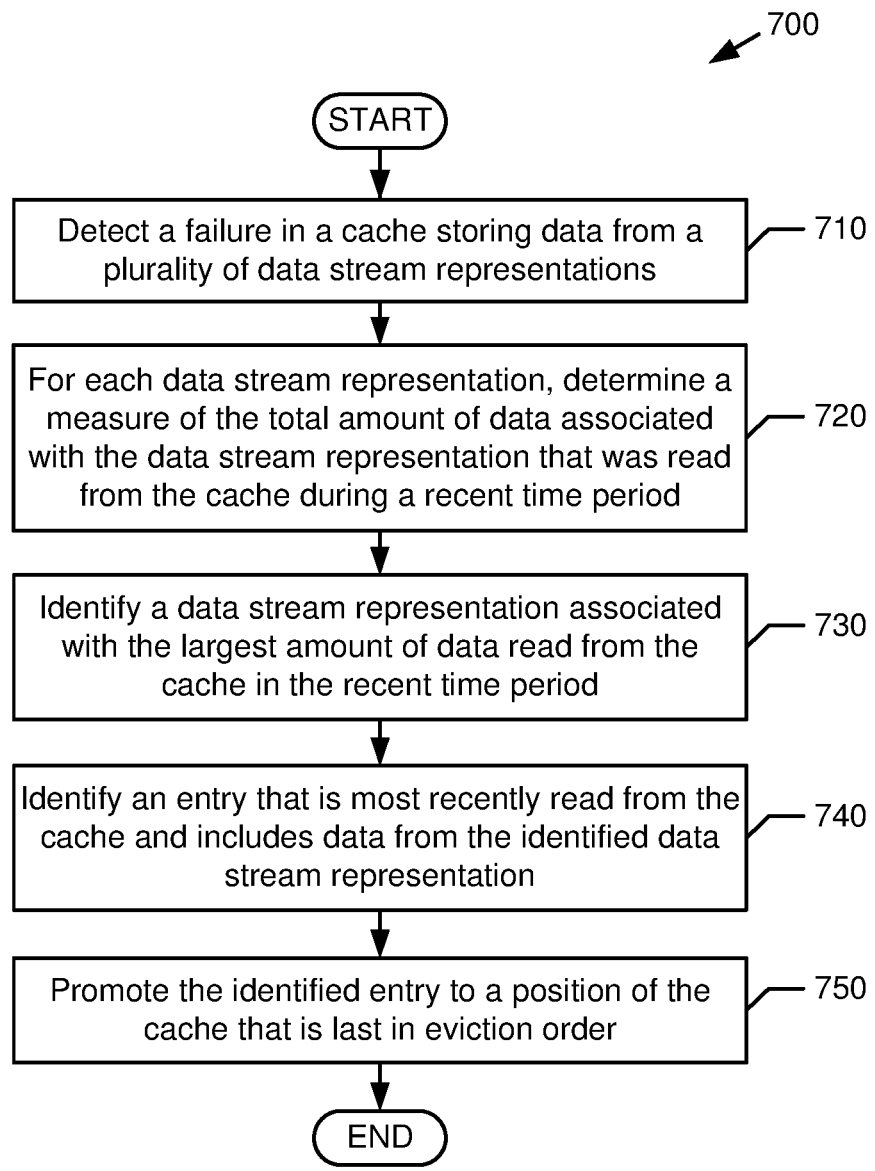
FIG. 7 is an illustration of an example process, in accordance with some implementations.
Figure 8A:
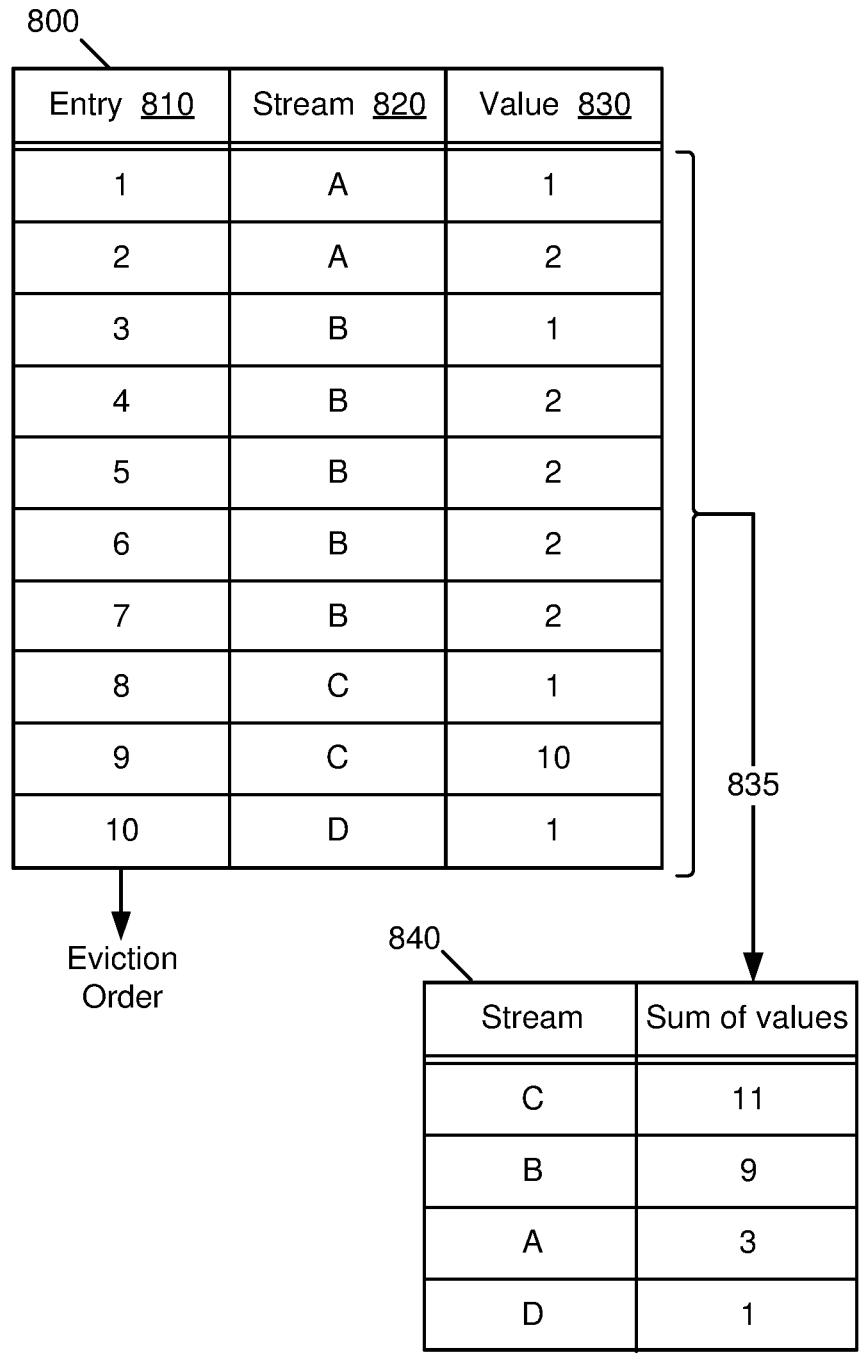
Figure 8B:
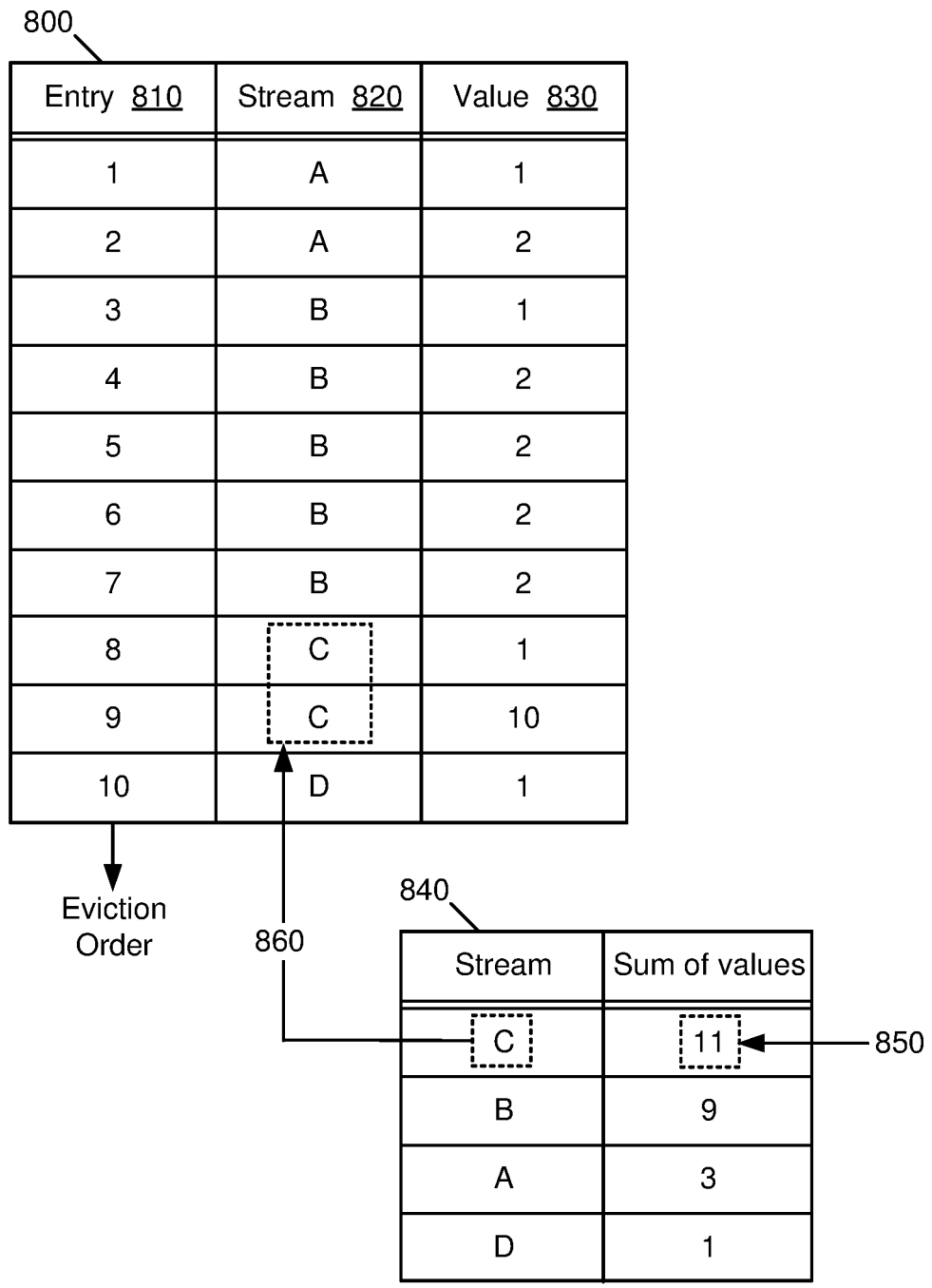

Referring now to FIG. 7, shown is an example process 700 for promoting a cache entry, in accordance with some implementations. The process 700 may be performed using the cache controller 185 and/or the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 are described below with reference to FIGS. 8A-8C, which show an example data structures in accordance with some implementations. However, other implementations are also possible.

Block 710 may include detecting a failure in a cache storing data from a plurality of data streams. For example, referring to FIG. 1, the cache 180 may store metadata (e.g., manifests 150 and container indexes 160) associated with multiple data streams 105 (e.g., during the generation of a synthetic full backup). The cache controller 185 may count the total number of misses that occur in the cache 180 during a specific time period, and may determine whether the number of misses exceeds a threshold level. In some implementations, the threshold level may be equal to the total number of entries in the cache 180. The cache controller 185 may detect a cache failure when the number of misses exceeds the threshold level.

Referring again to FIG. 7, block 720 may include, for each data stream representation, determining a measure of the total amount of data associated with the data stream representation that was read from the cache during a recent time period. For example, referring to FIGS. 1 and 8A, the cache controller 185 may determine or collect cache information 800 related to the cache 180. The cache information 800 may identify the data stream representation 820 that included the data currently stored in each cache entry 810. The cache information 800 may also identify a value metric 830 associated with each cache entry 810. In some implementations, the value metric 830 may be a number indicating the amount of data that was read from the associated cache entry 810 during a recent time period (e.g., since the last detection of a cache failure). Further, in response to detecting a failure in the cache 180, the cache controller 185 may sum 835 the value metrics 830 by data stream representation 810, thereby determining sum of values information 840. The sum of values information 840 may indicate the total amount of data for each data stream representation 810 that was read from the cache 180.

Referring again to FIG. 7, block 730 may include identifying a data stream representation having the largest amount of data read from the cache in the recent time period. Block 740 may include identifying an entry that is most recently read from the cache and includes data from the identified data stream representation. For example, referring to FIGS. 1 and 8B, the cache controller 185 may use the sum of values information 840 to determine that data stream representation C had the largest amount 850 of data read from the cache 180 in the recent time period. The cache controller 185 may then determine 860 that entry 8 is the most recently read of the two cache entries (i.e., entries 8 and 9) that currently include data associated with data stream representation C. in some implementations, the most recently read cache entry that is associated with the data stream representation having the largest amount of data read from the cache (i.e., entry 8 in the example shown in FIGS. 8A-8C) may be considered to be the most useful entry for the current use context of the cache 180.

Referring again to FIG. 7, block 750 may include promoting the identified entry to a position of the cache that is last in eviction order. After block 750, the process 700 may be completed. For example, referring to FIGS. 1 and 8C, the cache controller 185 may perform a promotion 870 to move entry 8 to the lowest numbered position in the cache 180 (i.e., position 1), which is last in eviction order (i.e., the last to be evicted of entries 1-10). Further, as shown in FIG. 8C, the remaining entries 1-7 and 9-10 may be shifted downward in their respective positions in the cache 180. In this manner, the cache controller 185 may increase the period of time that the most useful entry for the current use context (i.e., entry 8) remains in the cache 180, and may thereby improve the performance of the cache 180.

Figure 9:
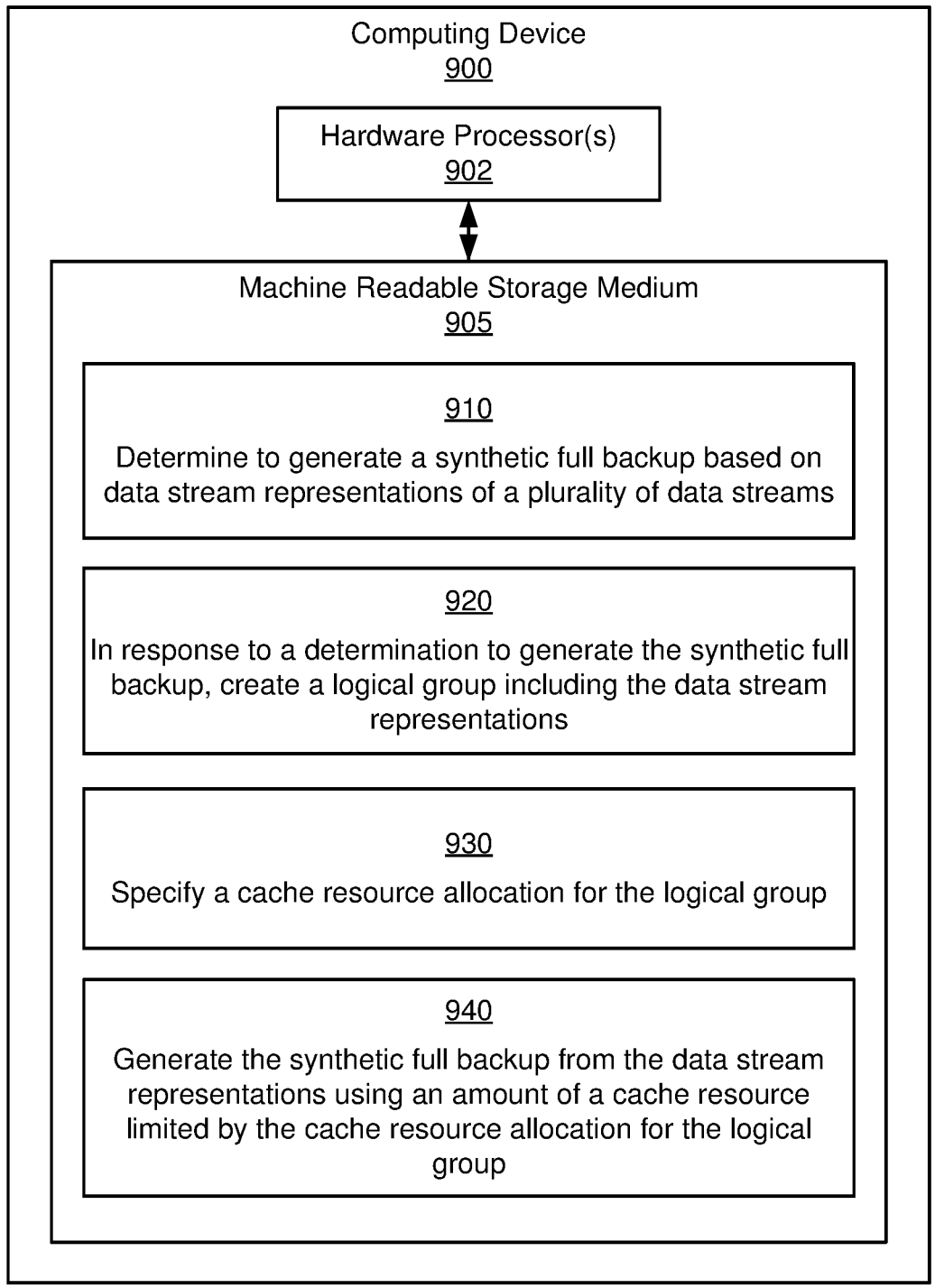
FIG. 9 is a schematic diagram of an example computing device, in accordance with some implementations.

FIG. 9—Example Computing Device

FIG. 9 shows a schematic diagram of an example computing device 900. In some examples, the computing device 900 may correspond generally to some or all of the storage system 100 (shown in FIG. 1). As shown, the computing device 900 may include hardware processor 902 and machine-readable storage 905 including instruction 910-940. The machine-readable storage 905 may be a non-transitory medium. The instructions 910-940 may be executed by the hardware processor 902, or by a processing engine included in hardware processor 902.

Instruction 910 may be executed to determine to generate a synthetic full backup based on data stream representations of a plurality of data streams. Instruction 920 may be executed to, in response to a determination to generate the synthetic full backup, create a logical group including the plurality of data stream representations. Instruction 930 may be executed to specify a cache resource allocation for the logical group. Instruction 940 may be executed to generate the synthetic full backup using an amount of a cache resource limited by the cache resource allocation for the logical group.

Figure 10:
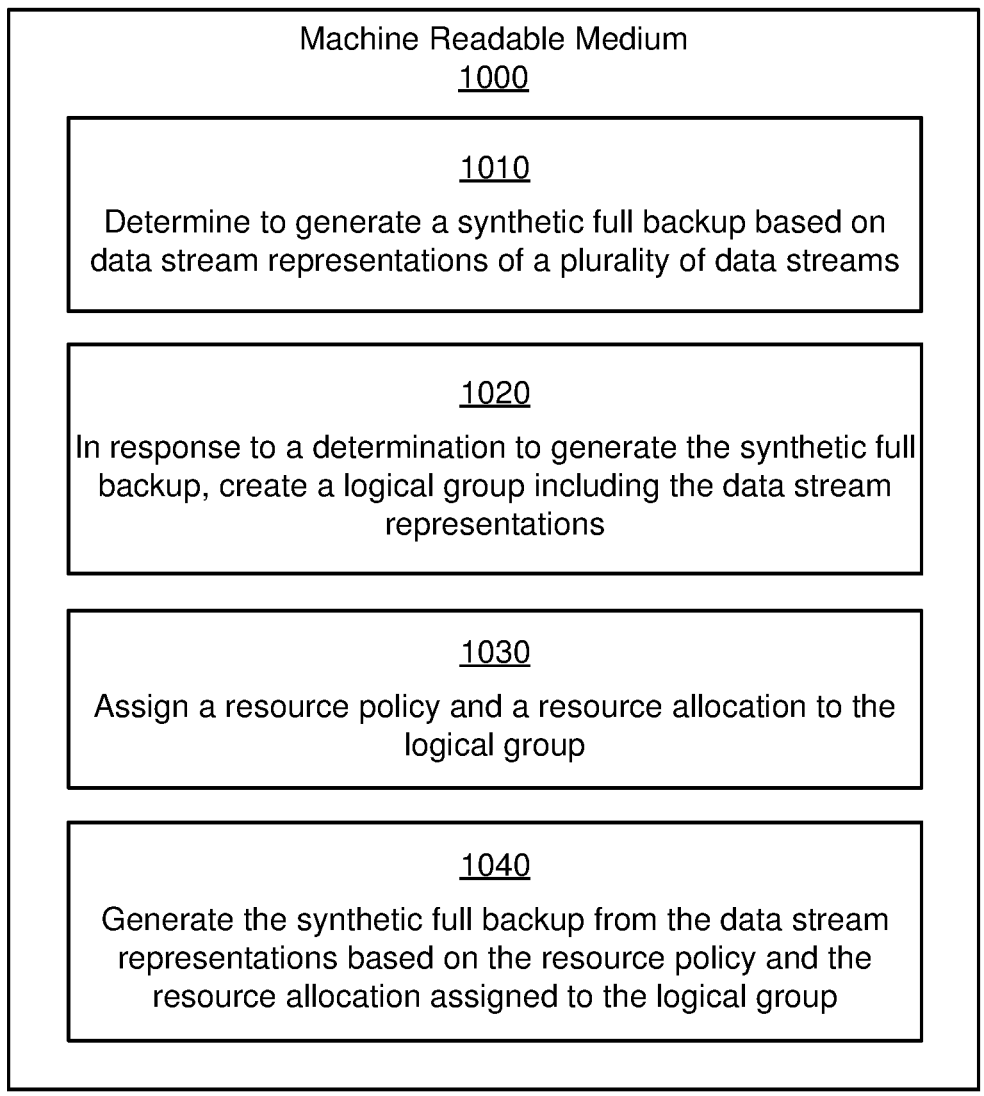
FIG. 10 is a diagram of an example machine-readable medium storing instructions in accordance with some implementations.

FIG. 10—Example Machine-Readable Medium

FIG. 10 shows a machine-readable medium 1000 storing instructions 1010-1040, in accordance with some implementations. The instructions 1010-1040 can be executed by a single processor, multiple processors, a single processing engine, multiple processing engines, and so forth. The machine-readable medium 1000 may be a non-transitory storage medium, such as an optical, semiconductor, or magnetic storage medium.

Instruction 1010 may be executed to determine to generate a synthetic full backup based on data stream representations of a plurality of data streams. Instruction 1020 may be executed to, in response to a determination to generate a synthetic full backup, create a logical group including the data stream representations. Instruction 1030 may be executed to assign a resource policy and a resource allocation to the logical group. Instruction 1040 may be executed to generate the synthetic full backup from the data stream representations based on the resource policy and the resource allocation assigned to the logical group.

Figure 11:
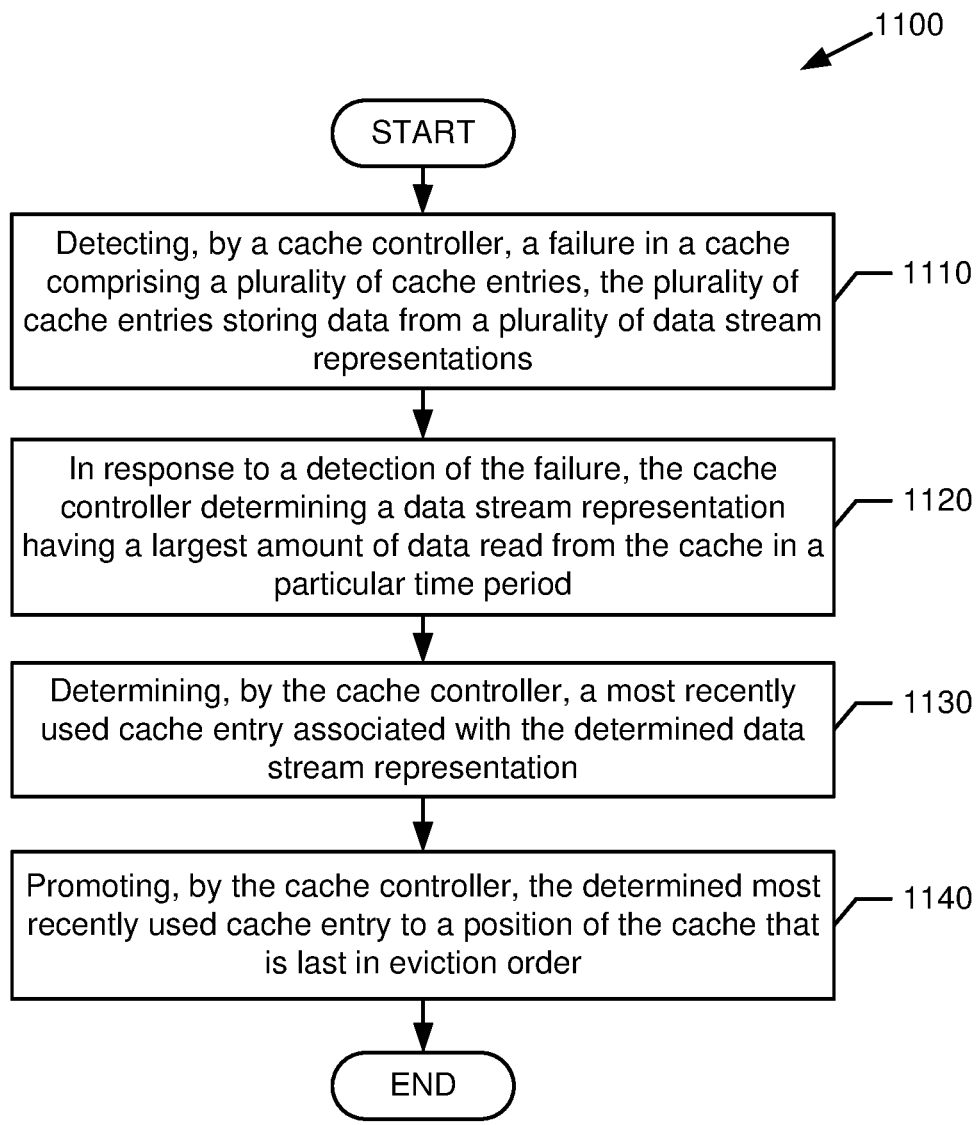
FIG. 11 is an illustration of an example process, in accordance with some implementations.

FIG. 11—Example Process for Promoting a Cache Entry

Referring now to FIG. 11, shown is an example process 1100 for promoting a cache entry, in accordance with some implementations. The process 1100 may be performed using the cache controller 185 (shown in FIG. 1). The process 1100 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 1110 may include detecting, by a cache controller, a failure in a cache comprising a plurality of cache entries, the plurality of cache entries storing data from a plurality of data stream representations. Block 1120 may include, in response to a detection of the failure, the cache controller determining a data stream representation having a largest amount of data read from the cache in a first time period. Block 1130 may include determining, by the cache controller, a most recently used cache entry associated with the determined data stream representation. Block 1140 may include promoting, by the cache controller, the determined most recently used cache entry to a position of the cache that is last in eviction order.

Some implementations described herein may include a storage controller to generate a logical group including multiple data stream representations that are associated with a synthetic full backup. The logical group may be assigned a resource policy and one or more resource allocations. When generating the synthetic full backup, the controller may manage use of the resource allocation in the logical group according to the resource policy. In this manner, the overall utilization of the resource may be intelligently managed to increase efficiency and reduce waste of the resource.

In addition, some implementations may include a cache controller to promote a cache entry that is predicted to be most useful in a current context. This process may include determining which data stream representation has been most used during a specific time period, identifying the most recent entry of the cache that includes data from the most used data stream representation, and promoting the identified entry within the cache. In this manner, the data that is most useful for the current context may remain in the cache for a longer period of time, and may thereby improve the performance of the cache.

Note that, while FIGS. 1-11 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 and/or the cache controller 185 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
   a processor; and
   a machine-readable storage storing instructions, the instructions executable by the processor to:
      determine to generate a synthetic full backup based on data stream representations of a plurality of data streams;
      in response to a determination to generate the synthetic full backup, create a logical group including the data stream representations;
      specify a cache resource allocation for the logical group; and
      generate the synthetic full backup from data stream representations using an amount of a cache resource limited by the cache resource allocation for the logical group.

2. The storage system of claim 1, including instructions executable by the processor to:
   specify a resource policy for the logical group; and
   during generation of the synthetic full backup, manage use of the resource allocation within the logical group according to the resource policy.

3. The storage system of claim 2, wherein the resource policy is one selected from a fixed allocation policy, a bounded scaling policy, a non-linear scaling policy, and a client directed policy.

4. The storage system of claim 1, wherein the plurality of data streams corresponds to a full backup and a plurality of incremental backups.

5. The storage system of claim 1, further comprising
   a cache; and
   a cache controller to:
      in response to a detection of a failure in the cache, identify a data stream representation associated with the largest amount of data read from the cache in a first time period;
      determine a most recently used cache entry associated with the identified data stream representation; and
      promote the determined most recently used cache entry to a position of the cache that is last in eviction order.

6. The storage system of claim 5, the cache controller to:
   track a total number of misses that occur in the cache during the first time period; and
   detect the failure in the cache in response to a determination that the total number of misses exceeds a threshold level.

7. The storage system of claim 1, including instructions executable by the processor to:
   in response to a determination that a particular data stream representation is no longer needed to generate the synthetic full backup, remove the particular data stream representation from the logical group.

8. The storage system of claim 1, including instructions executable by the processor to:
   in response to a determination that all of the data stream representations are no longer needed to generate the synthetic full backup, delete the logical group.

9. A non-transitory machine-readable medium storing instructions that upon execution cause a processor to:
   determine to generate a synthetic full backup based on data stream representations of a plurality of data streams;
   in response to a determination to generate the synthetic full backup, create a logical group including the data stream representations;
   assign a resource policy and a resource allocation to the logical group; and
   generate the synthetic full backup from the data stream representations based on the resource policy and the resource allocation assigned to the logical group.

10. The non-transitory machine-readable medium of claim 9, including instructions that upon execution cause the processor to:
   during generation of the synthetic full backup, manage use of the resource allocation within the logical group according to the resource policy.

11. The non-transitory machine-readable medium of claim 9, wherein the resource policy is one selected from a fixed allocation policy, a bounded scaling policy, a non-linear scaling policy, and a client directed policy.

12. The non-transitory machine-readable medium of claim 9, including instructions that upon execution cause the processor to:
   in response to a determination that a particular data stream representation is no longer needed to generate the synthetic full backup, remove the particular data stream representation from the logical group.

13. The non-transitory machine-readable medium of claim 9, including instructions that upon execution cause the processor to:
   in response to a determination that all of the data stream representations are no longer needed to generate the synthetic full backup, delete the logical group.

14. A method comprising:
   determining, by a controller of a storage device, whether to generate a synthetic full backup based on data stream representations of a plurality of data streams;
   in response to a determination to generate the synthetic full backup based on the data stream representations of the plurality of data streams, creating, by the controller, a logical group including the data stream representations of the plurality of data streams;
   assigning, by the controller, a resource allocation to the logical group including the data stream representations of the plurality of data streams; and generating, by the controller, the synthetic full backup from the data stream representations based on the resource allocation assigned to the logical group.

15. The method of claim 14, comprising:

specifying a resource policy for the logical group; and during generation of the synthetic full backup, managing use of the resource allocation within the logical group according to the resource policy.

16. The method of claim 15, wherein the resource policy is one selected from a fixed allocation policy, a bounded scaling policy, a non-linear scaling policy, and a client directed policy.

17. The method of claim 14, wherein the plurality of data streams corresponds to a full backup and a plurality of incremental backups.

18. The method of claim 14, comprising:

in response to a determination that a particular data stream representation is no longer needed to generate the synthetic full backup, removing the particular data stream representation from the logical group.

19. The method of claim 14, comprising:

in response to a determination that all of the data stream representations are no longer needed to generate the synthetic full backup, deleting the logical group.

20. The method of claim 14, comprising:

detecting a failure in a cache in response to a determination that a total number of misses exceeds a threshold level.

* * * * *